United States Patent Office 3,246,694
Patented Apr. 19, 1966

3,246,694
WATER FLOODING PROCESS FOR THE RECOVERY OF OIL
Joseph J. Taber, Cheswick, and Malcolm R. J. Wyllie, Allison Park, Pa., assignors to Gulf Research & Development Company, Pittsburgh, Pa., a corporation of Delaware
No Drawing. Filed Jan. 17, 1963, Ser. No. 252,034
9 Claims. (Cl. 166—9)

This invention relates to the production of oil and more particularly to a water flooding process in which water is injected into an oil-bearing formation to drive oil through the formation to a production well.

During early stages of water flooding a reservoir having a continuous oil phase, oil substantially free of water flows through the reservoir into the production wells. Not all of the oil in the reservoir is driven ahead of the injected water, however. A portion of the oil at the trailing face of the bank of oil that builds up ahead of the flood water is trapped in the form of discontinuous ganglia in the reservoir rock by the advancing water. The capillary forces in the reservoir rock exceed the forces exerted by the water drive and are sufficient to prevent movement of the ganglia of oil through the restricted flow passages. When water has become continuous throughout the reservoir rock from the injection well to the production well, further injection of water will not cause the production of additional oil from that portion of the reservoir. Oil remaining in the reservoir rock in the form of discontinuous ganglia after the water drive is usually referred to as residual oil.

Attempts have been made to decrease the amount of residual oil remaining in oil-bearing formations after the water drive has been completed by incorporating a surfactant in the flood water. A surfactant will reduce the interfacial tension between the oil and water and reduce the capillary forces holding the discontinuous ganglia of oil in the porous rock of the reservoir. It has been found, however, that the surfactant is adsorbed on the surfaces of the reservoir rock and moves through the formation at a rate much lower than the flood water. The difference in rates of movement through the reservoir of the surfactant and the flood water causes the front of the flood water to become depleted of surfactant; hence, the surfactant flood becomes an ordinary water flood. Continued injection of water containing the surfactant until the entire flooded area is exposed to the surfactant is not economically feasible because of excessive surfactant costs.

This invention resides in a process for water-flooding an oil-bearing formation for the recovery of oil in which the residual oil remaining in the formation following the water flood is reduced. Oil containing an oil-soluble surfactant is injected into the reservoir at the injection well and is followed by a water flood. Oil dropping from the trailing face of the bank of oil and trapped by the advancing water drive then contains the oil-soluble surfactant. The flood water injected after the slug of oil is, therefore, in contact with oil in the presence of the surfactant which reduces the capillary forces causing residual oil to be trapped in the reservoir rock and reduces the amount of residual oil. Injection of flood water into the formation is continued to drive oil to a production well through which the oil is lifted to the surface.

The amount of oil left in place at the end of a conventional water flood operation is substantial. For example, the oil saturation of Berea sandstone following an ordinary water flood is approximately 40 percent of the pore volume of the Berea sandstone. We have found that the amount of residual oil remaining in the reservoir rock following a water flood can be reduced approximately 50 percent, depending upon the characteristics of the particular reservoir, by injecting oil containing an oil-soluble surfactant into the formation ahead of the flood water. In a Berea sandstone the oil saturation following the water drive process of this invention is approximately 20 percent.

The surfactant injected in solution in the oil reduces the interfacial tension between the oil and water, and by changing the angle of contact between the two liquids, changes the wetting characteristics of the formation. A surfactant capable of reducing the interfacial tension between the injected oil and the water to 3 dynes/centimeter or less should be used. Preferred surfactants are those capable of reducing the interfacial tension to less than 0.5 dyne/centimeter. In addition to reducing the interfacial tension between the oil and water, it is important that the surfactant be soluble in oil whereby a major part of the surfactant will remain in the oil slug. As the injected oil traverses the formation, it is in contact with connate water present in the reservoir, and the surfactant will become distributed through both the water and oil phases. Oil-soluble surfactants will remain principally in the oil phase; hence, will be available at the contact between the oil and the following flood water.

Nonionic, anionic, and cationic surfactants which are soluble in oil can be used in the water flood process of this invention. Among the suitable nonionic surfactants are those prepared by the reaction of tertiary octylphenol or nonylphenol with ethylene oxide. The number of ethylene oxide groups largely determines the oil or water solubility of the alkylphenoxy polyethoxy surfactants. Commercial oil-soluble surfactants in the octylphenol series and in the nonylphenol series are available in which the number of ethylene oxide groups per molecule ranges from 1 to 5.

Another group of suitable nonionic surfactants are those in the alkanolamide series prepared by condensing fatty acids with diethanolamine. Examples of such surfactants are compounds prepared by condensing diethanolamine with stearic acid to produce a compound having the formula $C_{17}H_{35}CON(CH_2CH_2OH)_2$ or by reacting oleic acid with ethanolamine to produce a compound having the formula $C_{17}H_{33}CON(CH_2CH_2OH)_2$.

Examples of anionic surfactants which can be used are sodium salts of esters of short-chain sulfocarboxylic acids, and petroleum sulfonates.

Sodium dioctyl sulfosuccinate

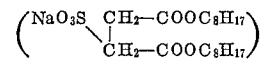

is a preferred surfactant because of its ability to reduce the interfacial tension between oil and aqueous solutions of sodium chloride to as low as 0.025 dyne/centimeter. Sodium dihexyl sulfosuccinate

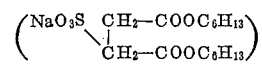

can also be used as the surfactant. Other suitable anionic surfactants are metal salts of sulfonated petroleum fractions. The salts of petroleum sulfonates having average molecular weights above 400 are oil soluble. Preferred petroleum sulfonates are sodium salts of the sulfonated petroleum fractions; however, other salts such as salts of calcium or barium can also be used.

Suitable cationic surface active agents are long alkyl chain quarternary ammonium salts. Examples of cationic surface active agents that can be used are dialkyl dimethyl ammonium chloride in which the alkyl group is a mixture of 8 percent octyl, 9 percent decyl, 47 percent dodecyl, 18 percent tetradecyl, 8 percent hexadecyl, and 10 percent octadecyl, or a narrower fraction in which the dialkyl portion of the molecule is 30 percent hexadecyl and 70 percent octadecyl.

Because of the oil solubility of the surfactant, it remains dispersed principally in the oil phase when the injected oil solution of the surfactant comes in contact with water present in the formation during the flooding operation. The low concentration of surfactant diffusing from the oil-water interface through the water film to the water-rock interface greatly reduces adsorption of the surfactant by the formation rock surfaces and allows the use of cationic surfactants.

The size of the oil slug injected into the reservoir ahead of the flood water will depend upon the reservoir characteristics. The injected oil slug, being miscible with and preferably slightly more viscous than the reservoir oil, drives the oil present in the formation ahead of it in a substantially pistonlike flow; hence, the oil remaining to be contacted by the flood water will be oil dropped from the trailing edge of the injected slug of oil and will contain dissolved surfactant. The amount of oil necessary in the oil slug to utilize the advantages of this invention throughout the flooded area will be approximately equal to the volume of residual oil that will be left in the reservoir at the end of the water flood. In Berea sandstone in which the residual oil remaining at completion of the water drive process of this invention is 20 percent of the pore volume, the oil slug injected ahead of the flood water should be approximately 20 percent of the pore volume of the flooded area of the reservoir. Few reservoir rocks have a residual oil saturation as high as that of Berea sandstone and many have a substantially lower residual oil saturation; hence an oil slug as large as 20 percent of the pore volume should be adequate in substantially all oil reservoirs. In some formations, the residual oil following the surfactant flood will be as low as 10 percent of the pore volume. In flooding such formations, an oil slug of 10 percent of the pore volume will be adequate.

The oil in which the surfactant is dissolved can be any oil which is miscible with the reservoir oil. Crude oil from the reservoir being flooded can be used. Preferred oils are oils which have a viscosity somewhat greater than that of the crude oil being recovered and an identical density.

The following examples illustrate the effect of preceding a water flood with an oil containing a surfactant in reducing the residual oil saturation in a porous rock.

*Example 1*

A core of Berea sandstone was flooded with an aqueous solution containing 2½ percent sodium chloride. Soltrol (a mixture of hydrocarbons of narrow boiling range similar in density and viscosity to kerosene) was then passed through the core until equilibrium was reached. Thereafter, approximately 0.2 pore volume of a solution containing 1.0 percent Triton GR–7, a dioctyl sodium sulfosuccinate, in Soltrol was passed through the core and followed by an aqueous solution containing 2½ percent sodium chloride. The flood of the core with the aqueous solution of sodium chloride was continued until no additional oil was displaced from the core. The results of the experimental work are presented in Table I.

*Example 2*

The procedure described in Example 1 was repeated with the exception that the concentration of surfactant in the Soltrol displaced through the core ahead of the final flood with the aqueous solution of sodium chloride was 0.1 percent.

*Example 3*

A Berea sandstone core was saturated with an aqueous 2½ percent sodium chloride solution, after which Soltrol was passed through the core until equilibrium was obtained. The core was then flooded with a 2½ percent sodium chloride solution until no additional oil was displaced from the core. The results of the brine flood are presented in Table I.

TABLE I

| Example No. | Oil at Beginning of Flood, Percent of Pore Vol. | Oil at End of Flood, Percent of Pore Vol. |
|---|---|---|
| 1 | 57.5 | 19.1 |
| 2 | 51.1 | 19.6 |
| 3 | 64.9 | 42.6 |

It will be noted from Table I that the oil saturation in the Berea sandstone core after flooding the core with an aqueous solution of sodium chloride, as described in Example 3, was approximately 40 percent of the pore volume. If the brine flood was preceded with a slug of 2/10 pore volume of Soltrol containing the surfactant, the oil saturation following the brine flood was reduced to slightly more than 19 percent of the pore volume of the core.

It is believed that because of the preferential solubility of the surfactant in oil very little of the surfactant diffuses across the oil-water interface through the water phase in the reservoir to the water-rock interface. Because of the low concentration of the diffusing surfactant in the water phase, the surfactant is not adsorbed appreciably on the surface of the rock and the oil slug does not become stripped of the surfactant. It is possible, therefore, by injecting a slug of oil containing an oil-soluble surfactant ahead of the water flood to insure the presence of the surfactant at the interface between the oil and the flood water.

We claim:

1. A method of recovering reservoir oil from a subsurface oil-bearing formation comprising injecting into said formation at an input well a slug of oil miscible with the reservoir oil, said slug being substantially devoid of water and containing an oil-soluble surfactant dissolved therein, said injected oil having a viscosity at least as high as the viscosity of the reservoir oil, thereafter injecting into said formation at the input well an aqueous liquid to drive the injected oil and reservoir oil through the formation toward a production well spaced from the input well, and recovering reservoir oil from said formation at the production well.

2. A method as set forth in claim 1 in which the volume of oil injected into the formation is approximately 10 to 20 percent of the pore volume of the formation flooded by the aqueous liquid injected into the formation.

3. A method as set forth in claim 1 in which the oil-soluble surfactant is in a concentration in the injected oil to reduce the interfacial tension between the injected oil and aqueous liquid to less than 3 dynes per centimeter.

4. A method as set forth in claim 1 in which the volume of oil injected into the formation is approximately 10 to 20 percent of the pore volume of the formation flooded by the injected aqueous liquid and the concentration of the oil-soluble surfactant reduces the interfacial tension between the injected oil and the aqueous liquid to less than 3 dynes per centimeter.

5. A method as set forth in claim 1 in which the oil-soluble surfactant is selected from the group consisting of reaction products of ethylene oxide with octylphenol, reaction products of ethylene oxide with nonylphenol, condensation products of fatty acids with diethanolamine, sodium salts of esters of sulfosuccinic acid, petroleum sulfonates, and dialkyl dimethyl quaternary ammonium salts.

6. A method as set forth in claim 1 in which the surfactant is sodium dioctyl sulfosuccinate and is in a concentration of 0.01 to 1.0 percent of the injected oil.

7. A method of recovering reservoir oil from a subsurface oil-bearing formation comprising injecting into said formation at an input well a substantially water-free slug containing an oil miscible with the reservoir oil and containing an oil-soluble surfactant dissolved therein, said injected oil having a viscosity substantially the same as the viscosity of the reservoir oil, thereafter injecting into said formation at the input well an aqueous liquid to drive the injected oil and reservoir oil through the formation toward a production well spaced from the input well, and recovering reservoir oil from said formation at the production well.

8. A method of recovering reservoir oil from a subsurface oil-bearing formation comprising injecting into said formation at an input well a slug of oil miscible with the reservoir oil and substantially devoid of water, said slug containing an oil-soluble surfactant dissolved therein, said injected oil having a viscosity higher than the viscosity of the reservoir oil, thereafter injecting into said formation at the input well an aqueous liquid to drive the injected oil and reservoir oil through the formation toward a production well spaced from the input well, and recovering reservoir oil from said formation at the production well.

9. A method of recovering reservoir oil from a subsurface oil-bearing formation comprising injecting into said formation at an input well an oil slug that is substantially devoid of water and is miscible with the reservoir oil and having a viscosity higher than the viscosity of the reservoir oil, thereafter injecting into said formation at the input well an aqueous liquid to drive the injected oil and reservoir oil through the formation toward a production well spaced from the input well, said injected oil being injected into the formation in an amount of approximately 10 to 20 percent of the pore volume of the formation flooded by the injected aqueous liquid and containing an oil-soluble surfactant dissolved therein in an amount between 0.1 and 1 percent to reduce the interfacial tension between the injected oil and the aqueous liquid to less than 3 dynes per centimeter, and recovering reservoir oil from said formation at said production well.

References Cited by the Examiner
UNITED STATES PATENTS

| | | | |
|---|---|---|---|
| 3,074,481 | 1/1963 | Habermann | 166—9 |
| 3,082,822 | 3/1963 | Holm | 166—9 |
| 3,149,669 | 9/1964 | Binder et al. | 166—9 |
| 3,181,609 | 5/1965 | Csaszar et al. | 166—9 |

CHARLES E. O'CONNELL, *Primary Examiner.*